Jan. 16, 1951     D. L. MORDELL ET AL     2,538,582
FUEL PUMP CONTROL FOR GAS TURBINE RESPONSIVE TO
INTAKE AIR PRESSURE AND TEMPERATURE
Filed April 30, 1948
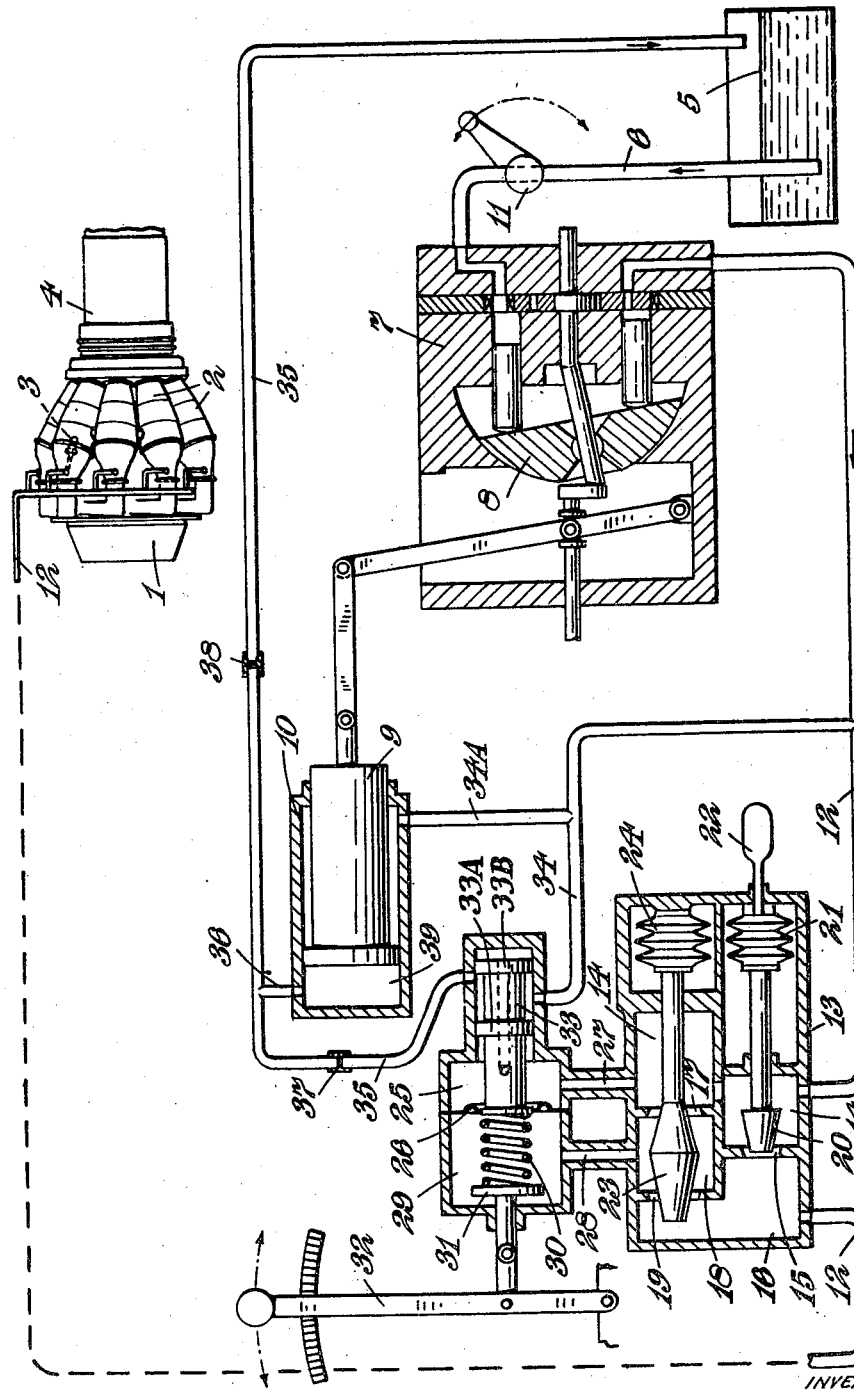
INVENTORS
DONALD L. MORDELL &
JOHN B. HOLLIDAY
by Wilkinson Mawhinney
ATTORNEYS Patented Jan. 16, 1951

2,538,582

UNITED STATES PATENT OFFICE 2,538,582

FUEL PUMP CONTROL FOR GAS TURBINE RESPONSIVE TO INTAKE AIR PRESSURE AND TEMPERATURE

Donald Louis Mordell, Montreal, Quebec, Canada, and John Bertram Holliday, Derby, England, assignors to Rolls-Royce Limited, Derby, England, a British company Application April 30, 1948, Serial No. 24,376
In Great Britain May 13, 1947

6 Claims. (Cl. 60—41)

1

This invention relates to gas-turbine-engine fuel systems, and more particularly to fuel systems for such engines when used for aircraft propulsion. Such engines normally comprise a compressor system, combustion equipment and a turbine assembly and may be used to provide a source of shaft-power driving an airscrew or equivalent and/or the exhaust from the turbine may issue as a high velocity gas stream for reaction propulsion purposes. In fuel system controls for such engines it is desirable that the pilot should be relieved of the need for making adjustments necessary due to variations in atmospheric conditions, for example, due to changes of altitude.

The present invention is applicable generally to gas-turbine-engines when used for aircraft propulsion, and seeks to provide an improved fuel system in which the fuel supply is regulated to vary with varying conditions of pressure and temperature at the engine inlet.

According to the present invention, a fuel system for a gas turbine engine comprises a fuel supply pump; means for varying the delivery of fuel by said pump to the engine; a pressure-sensitive device arranged by its movements to adjust the means varying the delivery of fuel by the pump; means for applying a predetermined load on said pressure-sensitive device in a sense tending to move the pressure-sensitive device to cause an increase of the fuel delivery by the pump to the engine; flow restricting means through which the actual fuel flow to the engine passes; pressure-responsive means subjected to air-intake pressure of the engine and arranged to vary the restriction in said flow-restricting means; temperature responsive means subjected to air-intake temperature to the engine and arranged to vary the restriction in said flow restricting means; pressure connections from said flow restricting means to said pressure-sensitive device to apply thereto a fluid pressure load to balance the predetermined load, which fluid pressure load is a function of the actual fuel flow to the engine, of air intake pressure to the engine and of air intake temperature to the engine.

In accordance with a feature of the invention, the fuel pump is of the variable capacity kind, and the pressure sensitive means is operative through a servo mechanism to vary the delivery of fuel thereby.

According to a preferred feature of this invention the flow restricting means may comprise a pair of orifices located hydraulically in series, a valve member under control of the pressure responsive means to vary the effective area of said orifices in unison so that the effective area of one orifice varies as a function of the air intake pressure and so that the sum of the reciprocals of the squares of the effective areas of the orifices is constant, a third orifice located hydraulically in parallel with said first two orifices, and a second valve member cooperating with the third orifice and movable under control of the temperature responsive means to vary the effective area of the third orifice as a function of the air intake temperature. In such an arrangement the fluid pressure load applied to the pressure-sensitive device may conveniently be the load arising from applying the pressure drop across the orifice whose area is varied in accordance with the air intake pressure, across the pressure-sensitive device.

One arrangement of a gas-turbine engine fuel system will now be described by way of example of this invention, reference being made to the accompanying diagrammatic drawing.

Referring to the drawing, the gas-turbine engine 1 is of a well-known construction comprising a compressor, combustion chambers and a turbine which drives the compressor. The compressor delivers air to the combustion chambers 2 to which fuel is delivered through injection-devices 3 to be burnt in the air and the hot gases from the combustion are passed through the turbine to drive it. The exhaust gases leave the engine through a jet-pipe 4 for propulsion purposes.

Fuel is delivered to the injection-devices 3 by a fuel system comprising a reservoir 5 from which fuel is withdrawn through pipeline 6 by an engine-driven multi-plunger pump 7 the capacity of which is varied by changing the plunger stroke. This is effected by altering the inclination of a swash-plate 8 under control of a piston 9 working in a cylinder 10. A shut off cock 11 is provided in the pipeline 6. The pump 7 delivers through a pipe-line 12 to the injection devices 3 and flow restricting means 13 is provided in the pipe-line 12 to control the delivery to the injection devices. It will be seen that the flow restricting means 13 passes the actual fuel flow to the engine.

The flow restricting means 13 comprises two passages in parallel, one passage being from a chamber 14 through an orifice 15 to a chamber 16, and the other being from chamber 14 through orifice 17, intermediate chamber 18 and orifice 19 to the chamber 16.

The fuel flow through the orifice 15, i. e.

through the first passage, is controlled by a needle valve 20 which is carried by an expansible capsule 21, the interior of which communicates with a thermometric bulb device 22 located in the air intake to the engine. The bulb 22 and capsule 21 are filled with a suitable liquid so that the capsule is constrained to expand or contract in accordance with variations of the air intake temperature. The effective area of the orifice 15 will be referred to as $A_3$.

The flow through the other passage is controlled by varying the effective areas $A_1$, $A_2$ of the orifices 17 and 19 respectively by means of a double-faced needle valve 23 the position of which is controlled by an evacuated capsule 24, expansion and contraction of which is arranged to be dependent on variations of the absolute air pressure at the engine intake.

The chamber 14 is in communication through a passage 27 with one side 25 of a pressure sensitive means constituted by a diaphragm 26 and the chamber 18 communicates through a passage 28 with the other side 29 of the diaphragm 26. This latter side of the diaphragm is also loaded by resilient means 30, the abutment 31 for which is adjustable by being linked to the pilot's control lever 32 so that the load on the diaphragm due to the resilient means 30 is dependent on the setting of the pilot's control lever 32. If the pressure in chamber 14 is $p_1$ and that in chamber 18 is $p_2$, then the resilient loading applied to the diaphragm is $(p_1-p_2)$ multiplied by the area of the diaphragm. The pressure in chamber 16 is referred to as $p_3$.

The diaphragm 26 operates a piston valve 33 having lands 33A and 33B of which land 33B controls the flow of servo-fluid from the pipe-line 12 through a branch 34 to a pipe-line 35 containing a pair of fixed restricting orifices 37, 38 to the reservoir 5. A branch 36 from the pipe-line 35 puts one side of piston 9 in communication with the pipe-line between the orifices 37, 38, and a branch 34A from the pipe-line 34 places the other side of piston 9 (which is of considerably less effective area) in communication with the delivery side of the pump 7.

In operation the resilient loading on the diaphragm 26 is increased as a result of movement of the pilot's control lever to the right thus tending to move the piston valve 33 and increasing the flow through the pipe-line 35 and the pressure in space 39. Thus the piston 9 is displaced to increase the angle of inclination of the swash plate 8 and therefore the pump stroke. The pressure drop $(p_1-p_2)$ which acts on the diaphragm in the opposite manner to decrease the pump stroke, therefore increases, and the diaphragm 26 and valve 33 are displaced to the left reducing the flow through a pipe line 35. The valve 33 is stabilized in a position in which the load due to spring 30 balances the load due to the pressure drop $(p_1-p_2)$ and in this position the loads on the servo piston will also balance.

The restriction afforded by the orifice 38 is greater than that afforded by restriction 37 so that when the piston valve 33 opens pipe-line 35 to the pressure line 34, an increase in the pump stroke will normally occur.

It will be appreciated that in the system described above the fuel stroke will stabilize the fuel delivery to the engine in accordance with the setting of the pilot's lever and in accordance with the pressure drop across the orifices, the areas of which are controlled as functions of the air-intake pressure and air-intake temperature.

The characteristics of the needle or throttle valves 20, 23 are selected in such a manner that changes of air intake pressure and temperature result in corresponding changes in restriction afforded by the orifices 15, 17, 19, to maintain a desired fuel flow.

It may be shown that for a given engine speed N, the highest efficiency of a gas-turbine engine either operating as a pure jet propulsion unit, or with an airscrew, is obtained with a given fuel flow factor $\phi$, which may be expressed by the equation $$\phi = \frac{F}{P_1} f(T_1)$$

where F is fuel flow, $P_1$ and $T_1$ are engine intake pressures and temperatures and $f(T_1)$ is a function of $T_1$. In principle, therefore the fuel system described is designed to meter the actual fuel flow F taking account of $P_1$ and $T_1$, in accordance with the preselected value of $\phi$. This preselected value of $\phi$ is determined by the setting of the pilot's control lever 32 whilst the orifices 15, 17, 19 maintain the value $$\frac{F}{P_1} f(T_1)$$

to the required setting.

During steady running, the piston valve 33 is always in the same position and each position of the pilot's lever 32 gives rise to a definite corresponding pressure difference $p_1-p_2$ which is dependent on the rating of the resilient means 30.

Now let it be assumed that the needle valve 23 is so proportioned that regardless of the position of the needle the areas $A_1$ and $A_2$ are related by the equation:

$$\frac{1}{A_1^2} + \frac{1}{A_2^2} = \text{a constant } \frac{1}{A_0^2}$$

where $A_0$ represents the effective area of orifices 17 and 19 in series. Let it further be assumed that the part of the needle co-operating with orifice 17 is so shaped that the area $A_1$ is directly proportional to $P_1$ (the engine intake pressure), and also that the area $A_3$ is controlled as a function of the air intake temperature $T_1$. The fuel flow $F_1$ through orifices $A_1$ and $A_2$ in series is then given by the equation:

$$p_1 - p_3 = \frac{k^2 F_1^2}{A_0^2}$$

where $k$ is an orifice flow constant assumed the same for each of the orifice areas $A_1$, $A_2$, $A_3$; whence:

$$F_1 = \frac{A_0}{k}\sqrt{p_1-p_3} \qquad \text{Equation i}$$

Likewise, the fuel flow $F_2$ through orifice $A_3$ is given by the equation:

$$p_1 - p_3 = \frac{k^2 F_2^2}{A_3^2}$$

whence $$F_2 = \frac{A_3}{k}\sqrt{p_1-p_3} \qquad \text{Equation ii}$$

Further the pressure drop $$p_1 - p_2 = \frac{k^2 F_1^2}{A_1^2}$$

whence $$F_1 = \frac{A_1}{k}\sqrt{p_1-p_2} \qquad \text{Equation iii}$$

The total fuel flow $F=F_1+F_2$ and this may be expressed as:

$$F=F_1\left(1+\frac{F_2}{F_1}\right)$$

and substituting values of $F_1$ and $F_2$ from Equations i and ii $$F=F_1\left(1+\frac{A_3}{A_0}\right)$$

and substituting for the value of $F_1$ from Equation iii $$F=\frac{A_1}{k}\sqrt{p_1-p_2}\left(1+\frac{A_3}{A_0}\right)$$

whence $$\frac{F}{A_1}\frac{1}{\left(1+\frac{A_3}{A_0}\right)}=\frac{1}{k}\sqrt{(p_1-p_2)}$$

Thus if $A_1$ is made to vary directly with $P_1$ and $$\frac{1}{1+\frac{A_3}{A_0}}$$

to vary as $f(T_1)$, we will have one value fuel flow factor $$\phi=\frac{F}{P_1}f(T_1)$$

corresponding to each value of $(p_1-p_2)$ which is a direct function of the control lever position. Thus for any setting of the lever the governor will adjust the pump stroke to give a definite value of $$\frac{F}{P_1}f(T_1)$$

By varying the shape of the needle in $A_3$, any desired function of $T_1$ can be obtained.

We claim:

1. A fuel system for a gas-turbine engine comprising a fuel supply pump; means for varying the delivery of fuel by said pump to the engine; a pressure-sensitive device arranged by its movements to adjust the means for varying the delivery of fuel by the pump; means for applying a pre-determined load on said pressure-sensitive device in the sense tending to move the pressure-sensitive device to cause an increase in the delivery of fuel; a first flow restricting orifice of effective area $A_3$, through which part of the fuel $F_2$ delivered to the engine actually passes; valve means controlling the area of said first flow restricting orifice arranged to be moved in accordance with engine air intake temperature; a second flow restricting orifice of effective area $A_1$; a third flow restricting orifice of effective area $A_2$, said second and third orifices being arranged in series with another and in parallel across said first flow restricting orifice to pass the remainder $F_1$ of the total fuel flow $F$; valve means for controlling the areas of said second and third flow restricting orifices in unison in accordance with air intake pressure of the engine so that areas $A_1$, $A_2$ conform to the equation:

$$\frac{1}{A_1^2}+\frac{1}{A_2^2}=\frac{1}{A_0^2}$$

where $A_0$ is a constant; a pressure connection at pressure $P_1$ from one side of the pressure sensitive device to the upstream side of the said first and second flow restricting orifices; and a pressure connection at pressure $P_2$ to the other side of the pressure sensitive device from the space between said second and third flow restricting orifices, thereby to apply a fluid pressure load to the pressure sensitive device in the sense to balance the predetermined load, which fluid pressure load is approximately proportional to the square of actual fuel flow to the engine, is predetermined function of air intake pressure and is a predetermined function of air intake temperature.

2. A fuel system as claimed in claim 1, wherein the orifices are arranged so that the area $A_1$ varies in direct proportion with air intake pressure and the value $$\frac{1}{1+\frac{A_3}{A_0}}$$

varies as a desired function of air intake temperature, whereby for pressure loading $(p_1-p_2)$ applied to the pressure sensitive means which loading is opposed by the predetermined load the equation:

$$\frac{F}{A_1}\frac{1}{1+\frac{A_3}{A_0}}=\frac{1}{k}\sqrt{p_1-p_2}$$

is satisfied, $F$ being the total fuel flow given by $F_1F_2$ to the engine and $k$ a constant.

3. A fuel system for a gas-turbine engine comprising a fuel-supply pump conduit means connecting the fuel-supply pump with the engine; means to vary the delivery of fuel by the pump to said conduit means; flow restricting means located in said conduit means to pass the actual fuel flow to the engine and comprising a first orifice having an effective area $A_1$, a second orifice having an effective area $A_2$ in series and downstream of said first orifice, a first valve member cooperating with said orifices, means responsive to the air intake pressure of the engine connected to said first valve member to adjust it relative to said first and second orifices said valve member being so formed that at any instant the effective area $A_1$ of the first orifice is varied to be proportional to the air intake pressure and the effective areas $A_1$, $A_2$ of the first and second orifices are varied to satisfy the equation $$\frac{1}{A_1^2}+\frac{1}{A_2^2}=\frac{1}{A_0^2}$$

where $A_0$ is constant, a third orifice of effective area $A_3$ connected in parallel across said first and second orifices, a second valve member cooperating with said third orifice to vary its effective area $A_3$ and means responsive to the air intake temperature of the engine connected to the second valve member to adjust it relative to the third orifice, said second valve member being so formed that the area $A_3$ is varied as a predetermined function of the air intake temperature; a pressure-sensitive device connected with the means to vary the delivery of fuel by the pump to adjust said means; loading means to apply a predetermined load to said pressure-sensitive device in a sense tending to move it to cause an increase in the fuel delivery; a fluid pressure connection from the conduit means upstream of said first and third orifices to said pressure-sensitive device to load it in opposition to said predetermined load; a second pressure connection from said conduit means between said first and second orifices to said pressure sensitive device to load it in the same sense as the predetermined load; whereby the pressure-sensitive device moves under control of said loads to vary the fuel delivery of the pump to maintain the predetermined load balanced against the difference in the fluid pressure loads, which difference is substantially proportional to the square of the actual fuel flow to the engine, is proportional to the air intake pressure and is a pre-determined function of the intake temperature.

4. A fuel system according to claim 3, comprising also a servo mechanism connecting the pressure sensitive device with the means to vary the fuel delivery of the fuel pump, said servo mechanism comprising a servo-piston to adjust the means to vary the fuel delivery of the pump, a cylinder within said piston works and a valve connected to the pressure-sensitive device to move therewith to control the supply of pressure fluid to the cylinder.

5. A fuel system as claimed in claim 3, comprising a servo mechanism connecting the pressure-sensitive device and the means to vary the fuel delivery of the pump, said servo mechanism comprising a servo cylinder; a servo piston working in said cylinder, having a substantially greater effective area on one surface than on the other surface and connected to the means to vary the fuel delivery of the pump; a branch conduit from the conduit means upstream of the flow restricting means to the servo cylinder on the side of the servo piston having the smaller effective area; a second branch conduit from the conduit means upstream of the flow restricting means; a pair of flow restrictors in series in said second branch connection; a conduit connecting the servo cylinder on the side of the servo piston having a greater effective area to the second branch conduit at a point between the flow restrictors; a servo control valve connected with the pressure-sensitive device to move therewith and arranged to control the flow of fuel from the conduit means in said second branch conduit to said flow restructors.

6. A fuel system as claimed in claim 3, wherein the means to apply a predetermined load to the pressure-sensitive means comprises a resilient means having one abutment on the pressure-sensitive means, a second abutment for the resilient means, and a selector member for adjusting the position of the second abutment.

DONALD LOUIS MORDELL.
JOHN BERTRAM HOLLIDAY.

REFERENCES CITED

The following references are of record in the file of this patent:

UNITED STATES PATENTS

| Number | Name | Date |
|---|---|---|
| 2,348,113 | Davis | May 2, 1944 |
| 2,414,617 | Summers | Jan. 21, 1947 |
| 2,422,808 | Stokes | June 24, 1947 |
| 2,440,566 | Armstrong | Apr. 27, 1948 |
| 2,440,663 | Ifield | Apr. 27, 1948 |
| 2,447,267 | Mock | Aug. 17, 1948 |

FOREIGN PATENTS

| Number | Country | Date |
|---|---|---|
| 526,998 | Great Britain | Sept. 30, 1940 |